US007525938B2

(12) United States Patent
Hurtta

(10) Patent No.: US 7,525,938 B2
(45) Date of Patent: Apr. 28, 2009

(54) SESSION CONTROL IN A COMMUNICATION SYSTEM

(76) Inventor: Tuija Hurtta, Pajusirkuntie 4 B, FIN-02660, Espoo (FI)

( * ) Notice: Subject to any disclaimer, the term of this patent is extended or adjusted under 35 U.S.C. 154(b) by 831 days.

(21) Appl. No.: 10/927,482

(22) Filed: Aug. 27, 2004

(65) Prior Publication Data

US 2005/0135389 A1   Jun. 23, 2005

(30) Foreign Application Priority Data

Dec. 17, 2003   (GB)   ................................ 0329221.6

(51) Int. Cl.
*H04W 4/00* (2006.01)
(52) U.S. Cl. ...................... 370/328; 370/410; 709/228; 455/432.3; 455/436
(58) Field of Classification Search ...................... None
See application file for complete search history.

(56) References Cited

U.S. PATENT DOCUMENTS

| 6,104,929 | A  | * | 8/2000  | Josse et al. ................... 455/445 |
| 6,233,458 | B1 | * | 5/2001  | Haumont et al. ............. 455/445 |
| 6,621,793 | B2 | * | 9/2003  | Widegren et al. ........ 370/230.1 |
| 6,683,853 | B1 | * | 1/2004  | Kannas et al. ............... 370/237 |
| 6,970,423 | B2 | * | 11/2005 | Chuah ......................... 370/230 |
| 7,010,305 | B2 | * | 3/2006  | Immonen et al. .......... 455/452.2 |
| 2001/0036175 | A1 | * | 11/2001 | Hurtta ......................... 370/352 |
| 2001/0054103 | A1 | * | 12/2001 | Chen ........................... 709/226 |
| 2002/0032800 | A1 | * | 3/2002  | Puuskari et al. ............. 709/246 |
| 2003/0065761 | A1 |   | 4/2003  | Cerja et al. |

FOREIGN PATENT DOCUMENTS

| WO | WO 00/10357 A1 | 2/2000 |
| WO | WO 01/86974 A2 | 11/2001 |
| WO | WO 01/91389 A2 | 11/2001 |

OTHER PUBLICATIONS

European Standard (Telecommunications series), "Digital Cellular Telecommunications System (Phase 2); General Packet Radio Service (GPRS); Service Description; Stage 2", ETSI EN 301 344 V6.6.0, Dec. 1999, pp. 1-110.

* cited by examiner

*Primary Examiner*—Wing F Chan
*Assistant Examiner*—Brian Roberts

(57) ABSTRACT

In a communication system, a communication session can be arranged by means of a node and a gateway. Control parameters are commonly signaled for the communication session from the node to the gateway. In the method the gateway is provided with information about the capabilities of the node. A decision in made if at least one of the control parameters for the communication session needs to be changed. If so, the new value of the at least one control parameter is determined based on information of the capabilities of the node. The node is then informed about the changed value of the least one control parameter. The communication session can then be controlled based on the changed value of the at least one control parameter.

28 Claims, 4 Drawing Sheets

SESSION CONTROL IN A COMMUNICATION SYSTEM

BACKGROUND OF THE INVENTION

1. Field of the Invention

The present invention relates to communication session control in a communication system, and in particular, but not exclusively, to control of a communication session established over a packet data network between a user equipment and another party.

2. Description of the Related Art

A communication system can be seen as a facility that enables communication sessions between two or more entities such as user equipment, controllers and/or other nodes associated with the system. The communication may comprise, for example, communication of voice, video, data, multimedia and so on. An application session may, for example, comprise a two-way telephone call or multi-way conference session or connection between a user equipment and an application server (AS), such as a service provider server or proxy. The establishment of communication sessions generally enables a user to be provided with various services.

Signalling between various entities associated with a communication session is typically required in order to control the communication session. Control is typically required for the set-up of the communication session and also later on during communication on the established communication session. The signalling can be based on an appropriate communication protocol or protocols.

The communication may be provided by fixed line and/or wireless communication interfaces. An example of the fixed line system is a public switched telephone network (PSTN). The wireless communication may be provided by means of a mobile communication system. Mobile communication systems refers generally to any telecommunications systems which enable a wireless communication when users are moving within the service area of the system. An example of a typical mobile communication system is a Public Land Mobile Network (PLMN).

The mobile communications network can provide an access network providing a user with a wireless access to external networks, hosts, or services offered by specific service providers. The user may need to have a subscribership with the mobile communications system in order to be able to use the services of the mobile system. The mobile subscription information of the subscriber may indicate parameters such as parameters regarding the quality of service (QoS) the subscriber is entitled to receive, priorities, service restrictions, security, authentications, and so on.

An access point or gateway node of the mobile communication network provides further access to an external network or an external host. For example, if the requested service is provided by a service provider located in another network, the service request is routed via a gateway to the other network and the service provider. The routing may be based on definitions in the mobile subscription information stored in the mobile network.

A more detailed example will now be described with reference to general packet radio service (GPRS). The GPRS operational environment comprises one or more subnetwork service areas, which are interconnected by a GPRS backbone network. A subnetwork may comprise a number of packet data service nodes (SN). In this specification the service nodes will be referred to as serving GPRS support nodes (SGSN). Each of the SGSNs is connected to radio networks, typically to base station systems and/or radio access networks by way of base station controllers (BSC) and/or radio network controllers (RNC) in such a way that they can provide a packet service for mobile user equipment via several base stations, i.e. cells. The intermediate mobile communication network provides packet-switched data transmission between a support node and mobile user equipment. The subnetworks are in turn connected to an external data network, e.g. to a packet data network (PDN), via GPRS gateway support nodes (GGSN). The GPRS thus allow transmission of packet data between mobile user equipment and external data networks.

A packet data protocol (PDP) context may be established to carry traffic flows over the communication system. A PDP context typically includes a radio access bearer provided between the user equipment, the radio network controller and the SGSN, and switched packet data channels provided between the serving GPRS service node and the gateway GPRS service node. A session between the user equipment and other party would then be carried on the established PDP context. A PDP context can carry more than one traffic flow, but all traffic flows within one particular PDP context are treated the same way as regards their transmission across the network. This requirement regarding the similar treatment is based on PDP context treatment attributes associated with the traffic flows. These attributes may comprise, for example, quality of service and/or charging attributes.

In GPRS networks, the mobile user equipment may optionally indicate, in a message requesting to activate a packet data protocol (PDP) context in the network, an access point name (APN) for selection of a reference point to a certain external network. A Serving GPRS support node (SGSN) may authenticate the mobile user and send a PDP context creation request to a gateway node (GGSN) selected e.g. according to the access point name given by the user equipment, or to default GGSN known by the SGSN.

Various features can be controlled by the serving controller entity, such as the SGSN, during a communication session. This control may be based on information associated with the subscription and stored in a dedicated subscriber information database. A well known example of the subscriber information database is a home location register (HLR). Another example is a home subscriber server (HSS).

Various user equipment (UE) such as computers (fixed or portable), mobile telephones and other mobile stations, personal data assistants or organizers, and so on are known to the skilled person. These all can be used to access the packet data networks, e.g. corporate intranets or the Internet, to obtain services. Mobile user equipment, typically referred to as a mobile station (MS), can be defined as a means that is capable of communication via a wireless interface with another device such as a base station of a mobile telecommunication network or any other station. The increasing popularity of Third Generation (3G) communication systems will, in all likelihood, significantly increase the possibilities for accessing services on the packet data networks via mobile user equipment (UE) as well as other types of LE.

The term "service" used above and hereinafter will generally be understood to broadly cover any service or goods which a user may desire, require or be provided with. The term also will generally be understood to cover the provision of complementary services. In particular, but not exclusively, the term "service" will be understood to include browsing, downloading, email, streaming services, Internet Protocol multimedia (IM) services, conferencing, telephony, gaming, rich call, presence, e-commerce and messaging, for example, instant messaging.

In the conventional communication systems, the control features are set and controlled by the serving controller node based on the subscription information stored at the subscriber information database or based on pre-configured settings in the serving controller node.

It might, however, be advantageous if, when controlling communication sessions at the access network side, the control could take into account the service requirements set forth by one or more other factors rather than just the subscription information.

It might also be advantageous in certain instances to be able to dynamically modify communication session treatment such as the quality of service (QoS) attributes and/or specifically the Allocation/Retention Priority (ARP) based on the requirements of the services for which the communication session is established. This is not possible in the current networks to the extent that is required in order to ensure sufficiently reliable operation of the system. For example, certain QoS attributes may only be downgraded from the values set by the user equipment, subscription information and/or pre-configured settings in the serving controller node. In addition, certain QoS attributes may not be modified at all within the system. For example, when an ARP value is set in the HLR for a subscriber's PDP context, this value cannot be modified within the system at all. In this example, modifying the ARP value may result in error cases in the elements within the system, e.g. in the SGSN. Because of these limitations, it may not be possible to upgrade QoS or modify the ARP at all with the prior art SGSN and GGSN arrangements.

As a more practical example, in the GPRS based systems, the SGSN may reserve resources for real-time PDP contexts as soon as it is possible, i.e. before signalling with the GGSN. The SGSN may then later modify the resource reservation in the instance that the QoS is downgraded by other elements of the system. The downgrading may be initiated, for example, by the GGSN or by the RNC.

The risks of error cases are increased because the SGSN operates based on subscription information and/or pre-configured settings, such as QoS restrictions and ARP values stored in the HLR, while the GGSN may operate based on service requirements. This may result to situations where the service would require attribute values from the GGSN that are not allowed for the subscriber by the HLR and/or the SGSN.

It could also be advantageous to have a policy controlling mechanism that could be used for a number of different services, and not just, as in the prior art, for one type of services, such as the IM services.

SUMMARY OF THE INVENTION

Embodiments of the present invention aim to address one or several of the above problems.

According to one embodiment there is provided a method in a communication system for controlling a communication session via a gateway, the method comprising the steps of:

signalling control parameters for the communication session from a node to the gateway;

providing the gateway with information about the capabilities of the node;

deciding that at least one of the control parameters for the communication session is to be changed;

determining a changed value of the at least one control parameter based on information about the capabilities of the node;

informing the node about the changed value of the at least one control parameter; and controlling the communication session based on the changed value of the at least one control parameter.

According to another embodiment there is provided a communication system comprising a gateway and controller means configured to decide if a value of at least one control parameter for a communication session via the gateway is to be changed from a value provided by a node associated with the communication session, to determine a changed value of the at least one control parameter based on information regarding the capabilities of the node associated with the communication session, and to inform the node associated with the communication session about the changed value of the at least one control parameter.

According to yet another embodiment there is provided a gateway for a communication system, the gateway being configured to receive control parameters for a communication session from a node associated with the communication session, to decide if the value of at least one control parameter for a communication session is to be changed from a value provided by the node associated with the communication session, to determine a changed value of the at least one control parameter based on information regarding the capabilities of the node associated with the communication session, and to output information about the changed value of the least one control parameter.

According to yet another embodiment there is provided a policy controller entity for a communication system, the communication system comprising a node and a gateway, the node being configured to provide the gateway with control parameters for communication sessions, wherein the policy controller entity is configured to decide if the value of at least one control parameter for a communication session via the gateway is to be changed from a value provided by the node and to determine a changed value of the at least one control parameter based on information regarding the capabilities of the node.

According to yet another embodiment there is provided a node for a communication system, the node being configured to provide a gateway with control parameters for a communication session and its capability information and to receive at least one changed control parameter from the gateway for use in control of the communication session based on the changed control parameter. The node may comprise a serving controller, a user equipment or the like.

The embodiments of the invention may provide a solution to the problem of communication sessions resulting in error situations due to requirements of services that are not in line with information stored at the subscriber information database and/or pre-configured in the serving controller node. Flexibility of the communication systems may also be improved.

BRIEF DESCRIPTION OF THE DRAWINGS

For better understanding of the present invention, reference will now be made by way of example to the accompanying drawings in which.

DETAILED DESCRIPTION OF THE PREFERRED EMBODIMENTS

Figure 1:
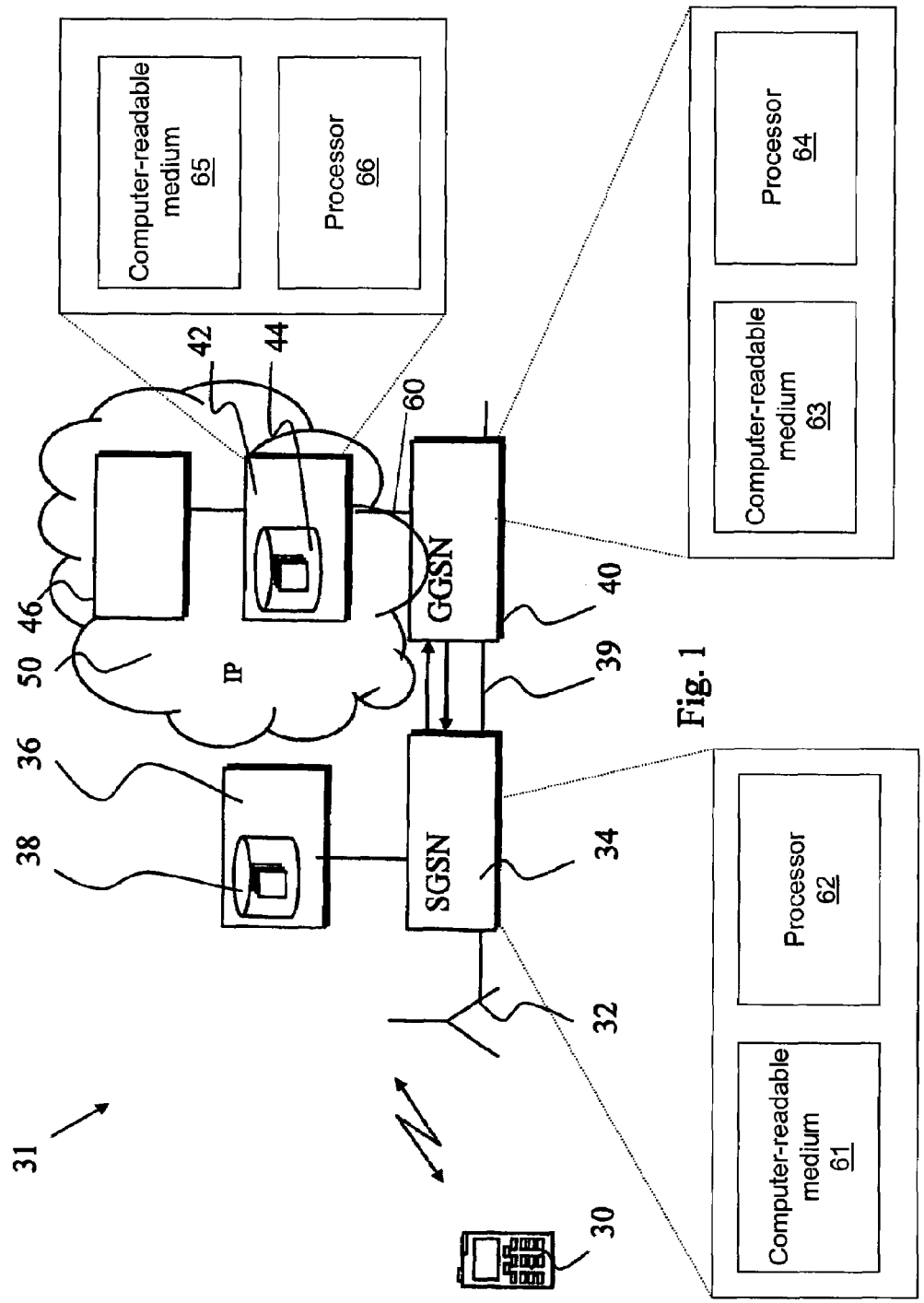
FIG. 1 shows schematically a communication system wherein the present invention may be embodied.

FIG. 1 shows a communication system according to certain embodiments of the present invention. More particularly, certain embodiments of the present invention will be described by way of example, with reference to the architecture of a third generation (3G) mobile communications system. However, it will be understood that certain embodiments may be applied to any other suitable form of network.

The mobile communication system 31 is typically arranged to serve a plurality of mobile user equipment 30. Each user equipment is typically provided with a wireless interface between the user equipment and base station 32 of the communication system 31.

The basic operational principles of a mobile user equipment, that may also be referenced to as a mobile station, are generally known by those skilled person. A mobile user equipment is normally configured for wireless communication with other stations, typically with the base stations of a mobile communication system for enabling mobility thereof. A mobile user equipment may include an antenna element for wirelessly receiving and/or transmitting signals from and/or to the base stations of the mobile communication system. A mobile user equipment may also be provided with a display for displaying images and/or other graphical information for the user of the mobile user equipment. Speaker means are also typically provided. The operation of the mobile user equipment may be controlled by means of an appropriate user interface, such as control buttons, voice commands and so on. Furthermore, a mobile user equipment is typically provided with a processor entity and/or a memory means. Communication between the user equipment and the entities of the communication network may be based on any appropriate communication protocol. A user may use the mobile user equipment for tasks such as, but not limited to, for making and receiving phone calls, for receiving and sending data from and to the network and for experiencing, for example, multimedia content by means of PDP contexts. For example, a user may access the network by means of a Personal Computer (PC), Personal Data Assistant (PDA), mobile station (MS) and so on.

It shall be appreciated that, although for clarity, only one equipment is shown in FIG. 1, a number of user equipment may be in simultaneous communication with a base station.

A mobile communication system, in turn, may logically be divided between a radio access network (RAN) and a core network (CN). In the simplified presentation of FIG. 1, the base station 32 belongs to the radio access network. It shall be appreciated that, although, for clarity, FIG. 1 shows the base station of only one radio access network, a typical communication network system usually includes a number of radio access networks.

The 3G radio access network (RAN) is typically controlled by appropriate radio network controller (RNC). This is not shown in order to enhance clarity. The radio access network controller is typically connected to an appropriate core network entity or entities such as, but not limited to, a serving general packet radio service support node (SGSN) 34. A subscriber information database entity 36 for storing information associated with the subscriber of the user equipment 30 is also shown. The HLR may contain various records 38 associated with the subscriber, such as details of PDP context subscriptions of the subscriber.

A user equipment within the radio access network may communicate with a radio network controller via radio network channels which are typically referred to as radio bearers (RB). These radio network channels may be set up in a mobile communication system in a known manner. Each user equipment 30 may have one or more radio network channels open at any one time with the radio network controller. The radio access network controller is in communication with the serving GPRS support node 34 via an appropriate interface, for example on an Iu interface.

The serving GPRS support node 34, in turn, typically communicates with a gateway GPRS support node 40 via the GPRS backbone network on interface 39. This interface is commonly a switched packet data interface. The serving GPRS support node 34 and/or the gateway GPRS support node 40 are for provision of support for GPRS services in the network.

Overall communication between user equipment 30 in the access entity and the gateway GPRS support node 40 is generally provided by a packet data protocol (PDP) context. Each PDP context usually provides a communication pathway between a particular user equipment and the gateway GPRS support node 40. Once established, a PDP context can typically carry multiple flows. Each flow normally represents, for example, a particular service and/or a component of a particular service. The PDP context therefore often represents a logical communication pathway for one or more flows across the network. To implement the PDP context between user equipment 30 and the serving GPRS support node 40, radio access bearers (RAB) are usually established which commonly allow for data transfer for the user equipment. The implementation of these logical and physical channels is known to those skilled in the art and is therefore not discussed further herein.

The user equipment may connect, via the GPRS network, to servers that are generally connected to an external packet data network such as, but not limited to, the exemplifying Internet Protocol (IP) network 50.

FIG. 1 shows an application providing server or proxy 46 connected to the GGSN 40 via policy decision function 42. The Policy Decision Function (PDF) 42 may be provided by an appropriate controller entity. A non-limiting example for the appropriate controller is an Internet Protocol Session Control (IPSC) entity.

The following describes some exemplifying embodiments how to support a flexible policy decision function such that modification of communication session attributes is enabled without increasing the risk of an error situation even if the modification would contradict with the subscription information stored in the subscriber information database, attribute values requested by user equipment 30, and/or with pre-configured settings in the SGSN 34.

In accordance with a preferred embodiment, the SGSN 34 sends capability information over the interface 39 to inform the GGSN 40 if it supports features such as QoS upgrade and/or ARP modification. This information may be provided by means of an indication included in an existing GPRS Transport Protocol (GTP) message. For example, the indication may be included into a Create PDP Context Request message 2 of FIG. 2 for sending from the SGSN 34 to the GGSN 40. This message can be used to indicate the capability information of the SGSN 34 serving the user equipment at the time of PDP context creation. Additionally, the indication may be included into an Update PDP Context Request message. This may be needed, for example, to indicate capability information of the new SGSN when the SGSN changes at inter-SGSN handover.

The capability information enables the GGSN 40 to became aware whether the SGSN 34 supports QoS upgrade and/or ARP modification or whether the PDP context procedure may result in an error case should an QoS upgrade and/or ARP modification happen. Based on this information a decision can be made whether such a QoS upgrade and/or ARP modification is allowed or not.

The GGSN 40 may use this information by itself for the decision making. The information may alternatively be forwarded to other service control functions which then may use this information when making decisions. For example, the information may be forwarded to a policy decision function (PDF) entity 42 using a second communication interface 60. As known to a person of skill in the art, SGSN 34 can include a computer-readable medium 61 coupled to a processor 62 and to interface 39. Processor 62 is configured to execute computer-readable instructions stored on computer-readable medium 61 that cause SGSN 34 to create and to send messages as described herein. As known to a person of skill in the art, GGSN 40 can include a computer-readable medium 63 coupled to a processor 64, to interface 39, and to second communication interface 60. Processor 64 is configured to execute computer-readable instructions stored on computer-readable medium 63 that cause GGSN 40 to create and to send messages as described herein. As known to a person of skill in the art, PDF 42 includes a computer-readable medium 65 coupled to a processor 66 and to second communication interface 60. Processor 66 is configured to execute computer-readable instructions stored on computer-readable medium 65 that cause PDF 42 to create and to send messages as described herein.

Figure 2:
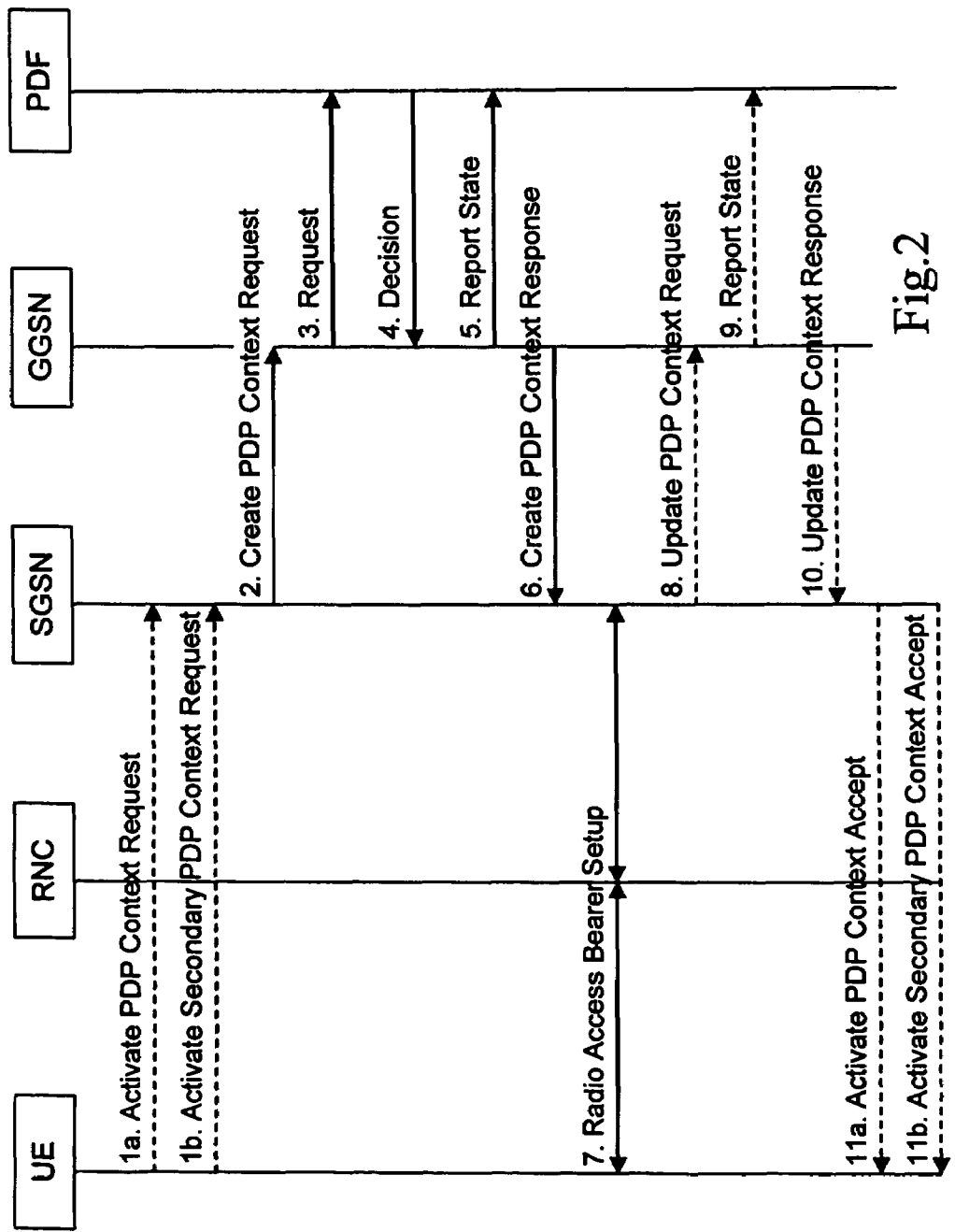
FIGS. 2 and 3 show signalling flowcharts for further exemplifying embodiments of the present invention.

FIG. 2 shows a detailed example of embodiments wherein capability information is exchanged between the SGSN and GGSN entities 34 and 40, respectively. More particularly, signalling flows for PDP contexts which are subject to the control by a PDF entity 42 are shown.

At the primary stage of PDP context activation, the user equipment 30 may send in message 1b an 'Activate PDP Context Request' to the SGSN 34. The message may include information regarding the IMSI, PDP Address, Access Point Name (APN), QoS Attributes and so on.

The SGSN 34 may then validate the request against PDP context subscription records received from the HLR associated with the subscription. The SGSN 34 may downgrade the QoS requested by the user equipment 30, if this is deemed to be necessary. If QoS has not been requested by the user equipment 30, the SGSN 34 may apply default QoS attribute values from the HLR. The SGSN 34 then sends message 2, for example an 'Create PDP Context Request' message to the GGSN. The message 2 may include information such as the IMSI (International Mobile Subscriber Identity), PDP Address, Access Point Name, QoS Attributes, and so on.

In addition, the message 2 may include capability information, for example an indication that QoS Upgrade is supported by the SGSN 34 and/or that ARP Modification is supported by the SGSN 34.

The Traffic Flow Template may include binding information.

If the SGSN 34 decides to downgrade the QoS attributes from the attributes requested by the user equipment or indicated by the HLR, the SGSN sends the downgraded QoS attributes in message 2 to the GGSN 40.

FIG. 2 shows also a message 1b requesting for activation of a secondary PDP context. If a secondary PDP context is to be activated, the user equipment 30 may send an 'Activate Secondary PDP Context Request' message 1b to the SGSN 34. As message 1a, this message may include information such as the QoS Attributes, and so on.

Upon receiving message 2 at PDP context activation or at secondary PDP context activation, the GGSN 40 may then send an authorization and policy request message 3 to the PDF 42.

The GGSN 40 may be configured such that it has a record of access point names (APN). The record may indicate whether the PDP contexts to that APN shall be subject to the control by the PDF entity 44 or not. The GGSN may thus send message 3 in response to determination whether an authorization and policy decision from the PDF 42 is required or whether the authorization and policy decision may be performed locally in the GGSN.

If an authorization and policy decision from the PDF 42 is required, the GGSN needs to resolve the PDF address. This may be accomplished by using the binding information which is carried in the Traffic Flow Template. A possibility is to use pre-configured PDF address information. The PDF address may be pre-configured in the GGSN per context access point.

Upon resolving the address, the GGSN 40 then sends the request message 3 including information such as the IMSI, Binding Information, QoS Upgrade Supported, ARP Modification Supported, and so on to the PDF 42.

The PDF 42 may use the information received from the GGSN 40 to derive attributes for decision making.

The PDF 42 may then perform an authorization and policy decision and send message 4 to the GGSN 40 reporting the decision. The message may include parameters such as Authorized QoS, and so on. If no capability information indicative that the QoS upgrade is supported and/or that the ARP modification is supported is received from the GGSN 40, the PDF 42 may be blocked from upgrading the QoS and/or modify the ARP to contradict the control at the SGSN.

Other QoS modifications may also be allowed.

The GGSN 40 then enforces the authorization and policy decision.

The GGSN 40 may send a 'Report State' message 5 to the PDF 42.

The GGSN 40 may then send a 'Create PDP Context Response' message 6 to the SGSN 34. This message informs the SGSN 34 of various attributes, such as Quality of Service attributes. For example, the message may include QoS attributes regarding the ARP, maximum bitrate, guaranteed bitrate, traffic class, traffic handling priority, and so on.

Radio access bearer establishment is then initiated by the SGSN 34. The set up is handled at messaging step 7.

Messaging steps 8 to 10 show how it is possible to address a situation which may occur when the QoS is downgraded by the SGSN or RNC. As shown the SGSN may initiate the PDP context modification procedure by message 8. The GGSN reports by message 9 the QoS change to the PDF and responds to the SGSN by message 9.

Message 11a is for activation of the primary PDP context. This may be accomplished by the SGSN by sending an 'Activate PDP Context Accept' message to the user equipment 30. Message 11b is for activations of a secondary PDP context. The messages may include various attributes, such as QoS Attributes, and so on.

The capability information of the serving controller, for example the SGSN 34, may be used after creation of the primary and/or secondary PDP context. For example, the capability information may be used in this way if there is a need to initiate PDP context update from the GGSN or the PDF. As a more detailed example, if the capability information of the SGSN indicates that QoS upgrade and/or ARP modification is not supported by the SGSN, then these should not be requested when initiating the PDP context update.

Figure 3:
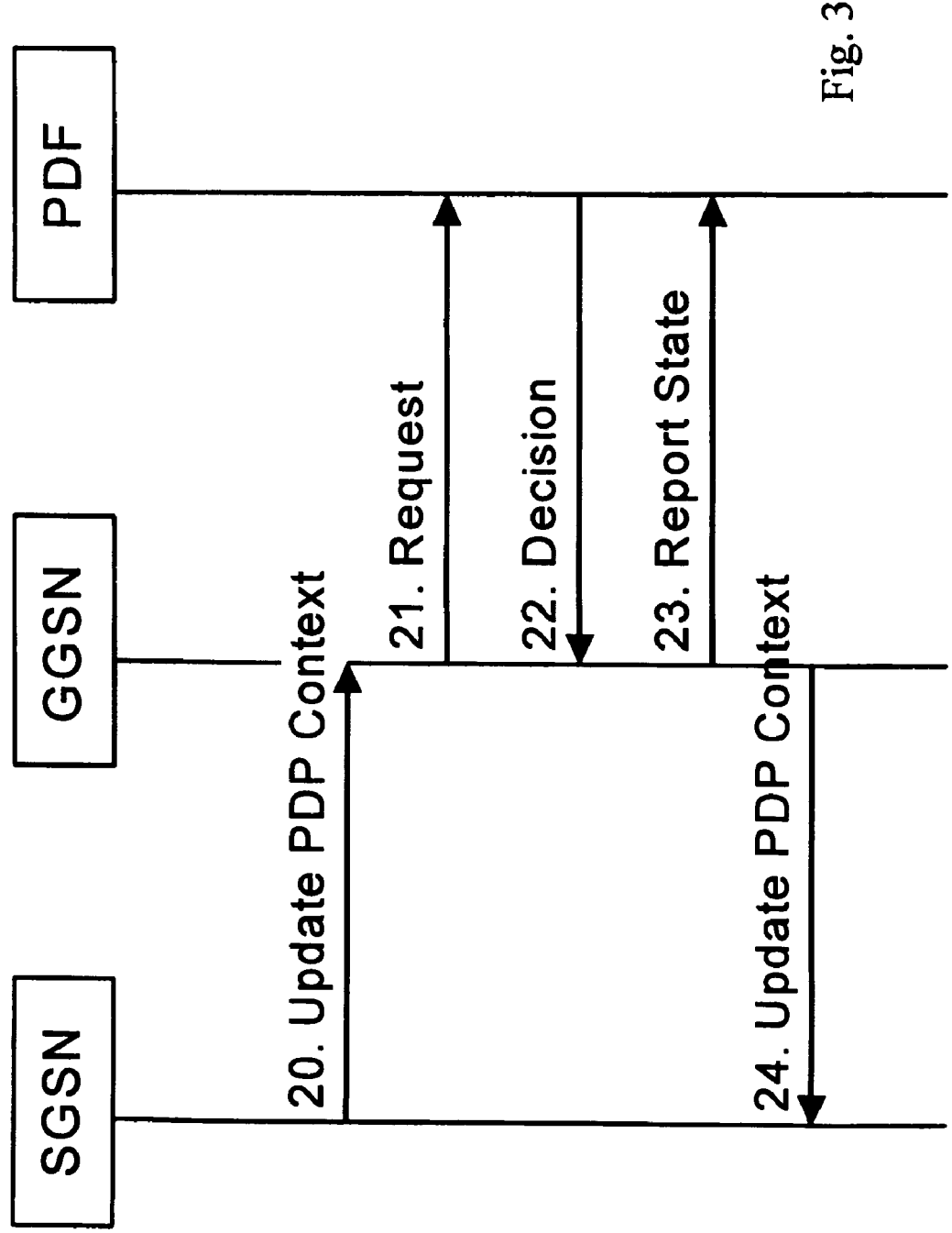
Figure 4:
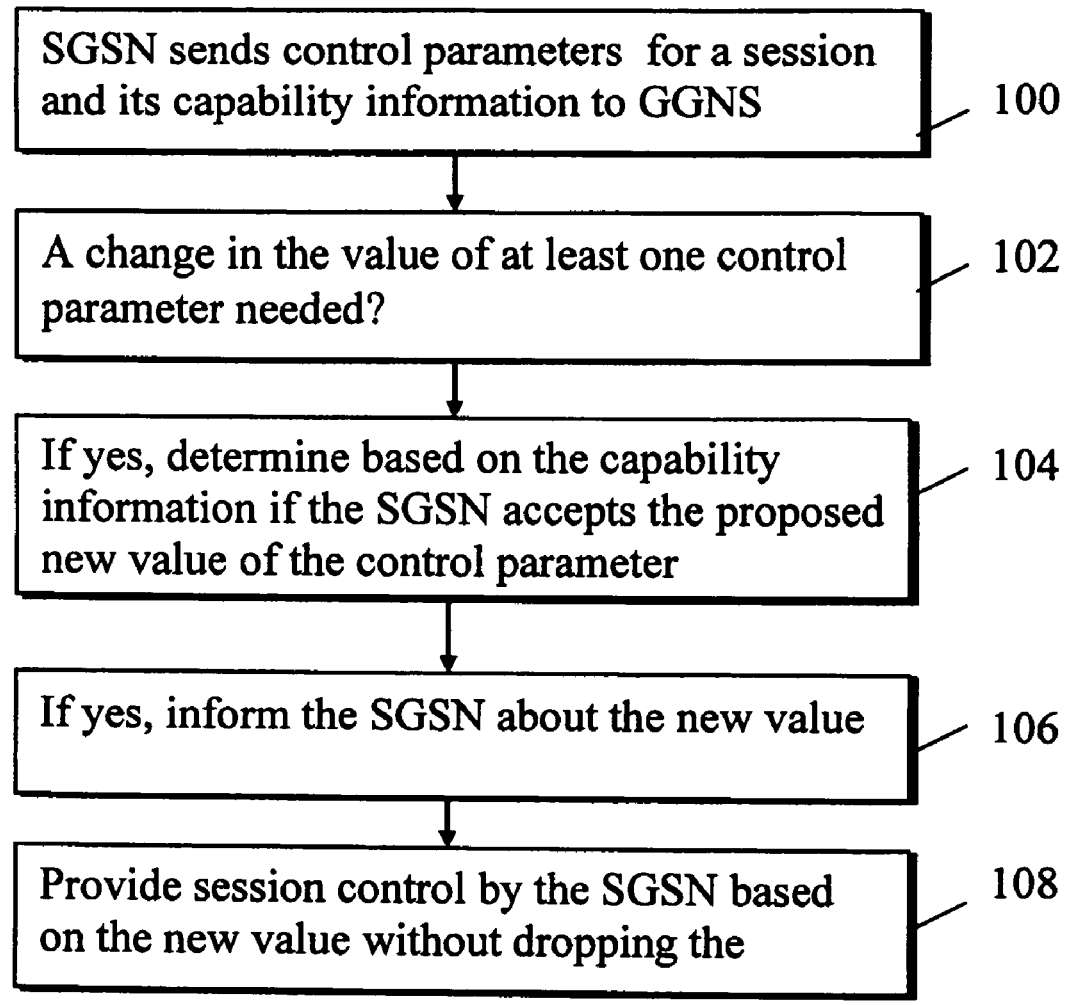
FIG. 4 is a flowchart illustrating the operation of an embodiment of the present invention.

FIG. 3 shows signaling steps for modification of the established PDP context. PDP context modification requiring the GGSN 40 to send an authorization and policy request to the PDF 42 may be initiated by the user equipment 30. The initial request is not shown in FIG. 3 for clarity. The SGSN 34 may then request for an update by sending message 20 to the GGSN 40. The GGSN 40 may be informed by means of the 'Update PDP Context Request' message of parameters such as the QoS, QoS Upgrade Supported, ARP Modification Supported, and so on.

In response to receiving the update request from the SGSN 34, the GGSN 40 may send an authorization and policy request message 21 to the PDF 42. As above, the GGSN 40 can be configured to determine whether an authorization and policy decision from the PDF 42 is required or whether the authorization and policy decision may be performed locally in the GGSN 40. The GGSN may need to send the authorization and policy request to the PDF if the QoS exceeds the previously authorized QoS, if new binding information is received, or if the SGSN capability information, i.e. QoS Upgrade Supported and/or ARP Modification Supported, has changed.

If an authorization and policy decision from the PDF is required, the GGSN 40 sends the message 21 requesting for a decision to the PDF 42. Message 21 may include parameters such as Binding Information, QoS Upgrade Supported, ARP Modification Supported and so on.

The PDF 42 may use the information received from the GGSN 40 to derive attributes for decision making and to make an authorization and policy decision. A message 22 including the decision is sent to the GGSN 40. The decision message indicates the Authorized QoS.

The GGSN 40 then enforces the authorization and policy decision. The GGSN may then send a Report State message 23 to the PDF. The GGSN also sends an Update PDP Context Response message 24 to the SGSN. The SGSN will then control the PDP context based on the attributes included in this message, e.g. the QoS Attributes, rather than based on attributes available from the subscriber information database associated with the particular subscriber and/or pre-configured settings.

In accordance with an embodiment the indication on supporting QoS upgrade and/or ARP modification may be included to a message from the user equipment. This may be required, for example, in applications where a legacy user equipment may result in an error case when QoS upgrade and/or ARP modification happens.

In another embodiment the SGSN does not provide the GGSN with information regarding its capabilities over the interface there between. Instead, the GGSN or the PDF may be configured to determine whether the SGSN supports features such as QoS upgrade and/or ARP modification. For example, if the SGSN and the GGSN are in the same PLMN, the GGSN or the PDF may determine from the basic settings of the PLMN if the SGSN supports or not the features. Identifier such as the SGSN IP address may be used when making the assumption.

If the SGSN and the GGSN are located in different mobile communication networks (for example, the user equipment is roaming in another network than a home network), the GGSN or the PDF may use the basic assumption that the SGSN does not support the PDF usage. This may require that the node making the assumption is provided with information regarding the circumstances. For example, the node may need to know the mobile country code (MCC) and/or mobile network code (MNC) of the SGSN, or corresponding information. Identifier such as the SGSN IP address may also be used when making the assumption. The identifier may be compared against records wherein certain SGSNs are marked as supporting features such as ARP modification and/or QoS upgrade and certain SGSNs are marked as not supporting.

If the GGSN or the PDF determines that QoS upgrade and/or ARP modification is not supported by the SGSN or by the user equipment, then these operations should not be taken because they may result in error cases.

In accordance with a further embodiment, the SGSN is configured such that it does not reserve resources for a real-time PDP context as soon as it is possible if the PDP context is controlled by a PDF. In the FIG. 2 embodiment this means that the resources are reserved at the SGSN 24 only in response to message 6 from the GGSN 40. This can be used to enable greater flexibility in the resource reservation.

The SGSN may be provided with indication that the PDP context is controlled by the PDF by various manners. For example, the indication may be provided by means of attribute(s) (for example max QoS attribute values) from the HLR or by a direct indication from the HLR that the PDP context is subject to PDF control. The latter example may require changes in the existing HLRs as the PDP context attribute set may need to have an indication of the PDF control. The SGSN may also be made aware of a list of access point nodes (APNs) which are controlled by the PDF. This information may be pre-configured in the SGSN. A possibility is to store the APN information in a domain name server (DNS) or any other appropriate database.

If a PDP context is controlled at least partially based on instructions provided by the PDF, the SGSN may reserve the resources in response to receiving signalling, for example a 'Create PDP Context Response' message from the GGSN. It should be noted that if the radio network controller is still allowed to downgrade the QoS, the resources may be reserved in the SGSN also when receiving signalling from the radio network controller.

It shall be appreciated that whilst embodiments of the present invention have been described in relation user equipment such as mobile stations, embodiments of the present invention are applicable to any other suitable type of user equipment.

In the above described examples the capability information associated with the capabilities of the serving controller. However, the invention is not limited to such embodiments but may also be applied to situation wherein the capability information associates with another node, for example with a user equipment.

The examples are explained with reference to PDP contexts. In alternative embodiments of the invention any suitable communication sessions may be controlled accordingly.

The embodiment of the present invention has been described in the context of a communication system that is based on a GPRS system. This invention is also applicable to any other communication systems where similar problems may exist.

In addition, the term policy decision function (PDF) is intended to cover all controller entities configured to control provision of services in systems wherein services can be provided for users and/or wherein different entities may have different service provisioning criteria.

It is also noted herein that while the above describes exemplifying embodiments of the invention, there are several variations and modifications which may be made to the disclosed solution without departing from the scope of the present invention as defined in the appended claims.

The invention claimed is:

1. A method of updating a communication session, the method comprising:
sending a request message to a gateway GPRS support node from a serving GPRS support node in response to an inter-serving GPRS support node handover, the request message indicating a request to update a communication session, wherein the request message includes an indicator indicating whether the serving GPRS support node supports a quality of service upgrade or allocation/retention priority modification.

2. The method of claim 1, wherein the request is message includes an access point name.

3. The method of claim 1, wherein the request is included in an existing general packet radio service transport protocol message.

4. The method of claim 3, wherein the existing general packet radio service transport protocol message is a create packet data protocol context request message.

5. The method of claim 3, wherein the existing general packet radio service transport protocol message is an update packet data protocol context request message.

6. A method of updating a communication session, the method comprising:

receiving a request message at a gateway GPRS support node from a serving GPRS support node in response to an inter-serving GPRS support node handover, the request message indicating a request to update a communication session, wherein the request message includes an indicator indicating whether the serving GPRS support node supports a quality of service upgrade or allocation/retention priority modification; and sending a response message from the gateway GPRS support node to the serving GPRS support node.

7. The method of claim 6, further comprising, determining if a decision from a policy decision function entity is required.

8. The method of claim 7, further comprising sending the received request message to the policy decision function entity if a decision from a policy decision function is required.

9. The method of claim 7, further comprising processing the request message at the gateway GPRS support node if a decision from a policy decision function is not required.

10. The method of claim 7, wherein the request message includes an access point name (APN) and further wherein determining if a decision from a policy decision function entity is required comprises comparing the APN to a record of access point names.

11. A method of updating a communication session, the method comprising:

receiving a request message at a gateway GPRS support node from a serving GPRS support node, the request message indicating a request to update a communication session in response to an inter-serving GPRS support node handover, wherein the request message includes an indicator indicating whether a serving GPRS support node supports a quality of service upgrade or allocation/ retention priority modification;

performing a decision making function associated with an authorization related to the communication session; and sending a decision message from the gateway GPRS support node to the serving GPRS support node.

12. The method of claim 11, further comprising deriving attributes for performing the decision making function based on information included in the received request message.

13. The method of claim 11, wherein the decision message includes an authorized quality of service.

14. A device comprising:

a communication interface, the communication interface configured to send and receive;

a computer-readable medium having computer-readable instructions stored therein which are programmed to create a request message in response to an inter-serving GPRS support node handover and to send the request message to a gateway GPRS support node using the communication interface, wherein the request message includes an indicator indicating whether the device supports a quality of service upgrade or allocation/retention priority modification; and a processor coupled to the communication interface and to the computer-readable medium and configured to execute the computer-readable instructions.

15. The device of claim 14, wherein the request message includes an access point name.

16. The device of claim 14, wherein the request is included in an existing general packet radio service transport protocol message.

17. The device of claim 16, wherein the existing general packet radio service transport protocol message is a create packet data protocol context request message.

18. The device of claim 16, wherein the existing general packet radio service transport protocol message is an update packet data protocol context request message.

19. A device comprising:

a communication interface, the communication interface configured to receive a request message from a serving GPRS support node, the request message indicating a request to update a communication session in response to an inter-serving GPRS support node handover, wherein the request message includes an indicator indicating whether the serving GPRS support node supports a quality of service upgrade or allocation/retention priority modification;

a computer-readable medium having computer-readable instructions stored therein which are programmed to create a response message and to send the response message to the serving GPRS support node using the communication interface; and a processor, the processor coupled to the communication interface and to the computer-readable medium and configured to execute the computer-readable instructions.

20. The device of claim 19, wherein the computer-readable instructions are further programmed to determine if a decision from a policy decision function is required.

21. The device of claim 20, wherein the computer-readable instructions are further programmed to send the received request message to the policy decision function entity if a decision from a policy decision function is required.

22. The device of claim 20, wherein the computer-readable instructions are further programmed to process the received request message if a decision from a policy decision function is not required.

23. The device of claim 20, wherein the request message includes an access point name (APN) and further wherein determining if a decision from a policy decision function entity is required comprises comparing the APN to a record of access point names.

24. A device comprising:

a communication interface, the communication interface configured to receive a request message from a serving GPRS support node, the request message indicating a request to update a communication session in response to an inter-serving GPRS support node handover, wherein the request message includes an indicator indicating whether a serving GPRS support node supports a quality of service upgrade or allocation/retention priority modification;

a computer-readable medium having computer-readable instructions stored therein which are programmed to perform a decision making function associated with an authorization related to the communication session and to send a decision message to the serving GPRS support node; and a processor, the processor coupled to the communication interface and to the computer-readable medium and configured to execute the computer-readable instructions.

25. The device of claim 24, wherein the computer-readable instructions are further programmed to derive attributes for performing the decision making function based on information included in the received request message.

26. The device of claim 24, wherein the decision message includes an authorized quality of service.

27. A computer-readable medium including computer-readable instructions stored therein that, upon execution by a processor, cause a first device to:

in response to an inter-serving GPRS support node handover, create a request message, wherein the request message includes an indicator indicating whether the first device supports a quality of service upgrade or allocation/retention priority modification.

28. A computer-readable medium including computer-readable instructions stored therein that, upon execution by a processor, cause a first device to:

in response to receipt of a request message from a second device wherein said request message was sent in response to an inter-serving GPRS support node handover, create a response message based on the received request message, wherein the received request message includes an indicator indicating whether the second device supports a quality of service upgrade or allocation/retention priority modification.

* * * * *

UNITED STATES PATENT AND TRADEMARK OFFICE
CERTIFICATE OF CORRECTION

PATENT NO. : 7,525,938 B2
APPLICATION NO. : 10/927482
DATED : April 28, 2009
INVENTOR(S) : Hurtta It is certified that error appears in the above-identified patent and that said Letters Patent is hereby corrected as shown below:

On the Title Page

Item [*] Notice: Subject to any disclaimer, the term of this patent is extended or adjusted under 35 U.S.C. 154(b) by (831) days Delete the phrase "by 831 days" and insert -- by 1,279 days --

Signed and Sealed this

First Day of June, 2010

David J. Kappos
*Director of the United States Patent and Trademark Office*